UNITED STATES PATENT OFFICE.

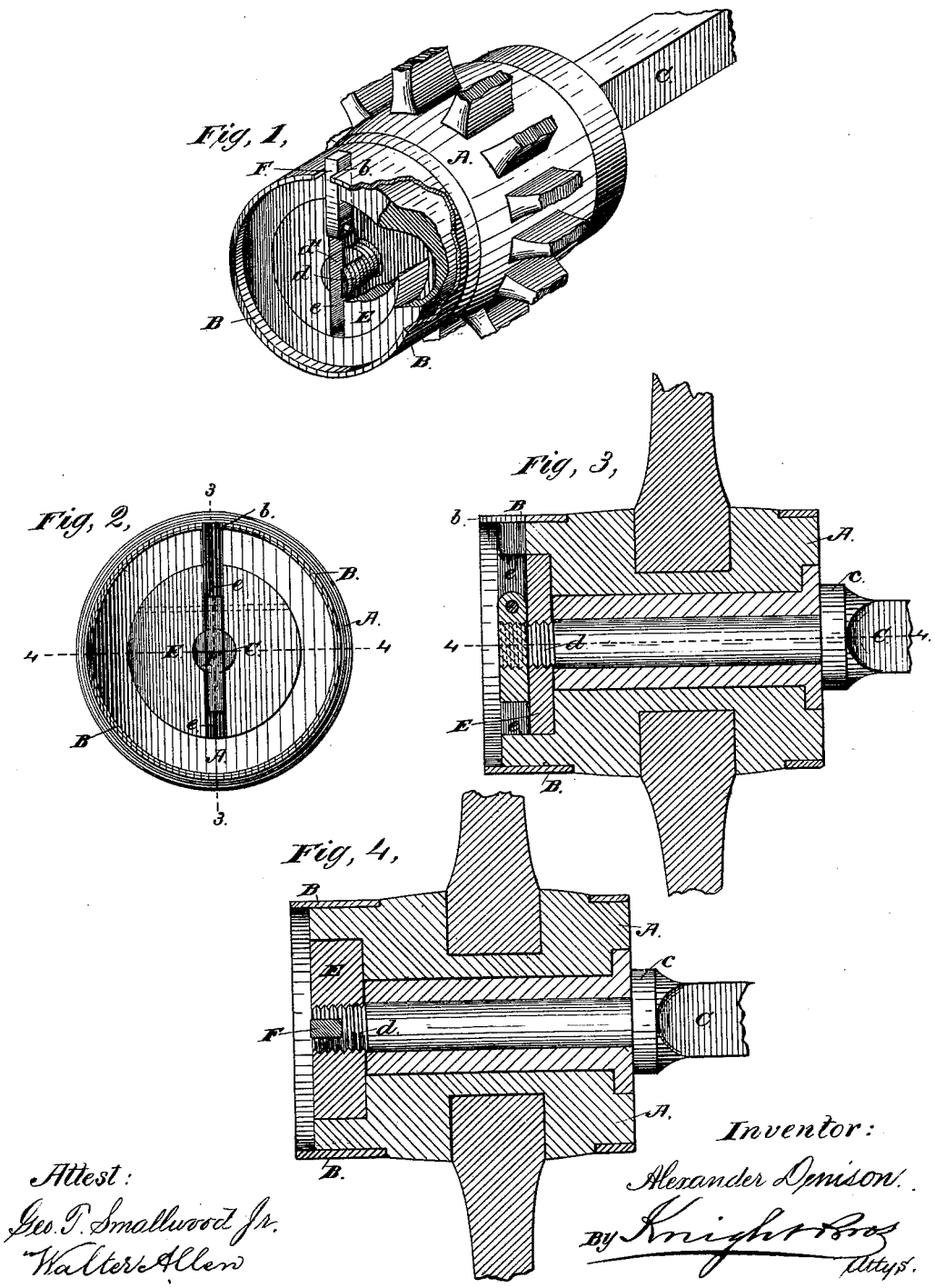

ALEXANDER DENISON, OF RIDGEWAY, OHIO.

IMPROVEMENT IN HUB-ATTACHING DEVICES.

Specification forming part of Letters Patent No. 218,000, dated July 29, 1879; application filed May 15, 1879.

*To all whom it may concern:*

Be it known that I, ALEXANDER DENISON, of Ridgeway, in the county of Hardin and State of Ohio, have invented new and useful Improvements in Devices for Securing and Removing Vehicle-Wheels, of which the following is a specification.

The object of my invention is to provide means whereby the retaining-nut may be readily locked to the axle to prevent it unscrewing, or connected to the wheel, so as to permit the employment of the latter as a wrench in screwing the nut on or off. To this end I employ a cylindrical nut fitting a recess of corresponding shape in the outer end of the hub, with a groove or recess extending diametrically across its face, in which is pivoted a key fitting a corresponding notch or recess formed in the end of the axle-spindle, so that by turning the key down into the groove in the nut it will extend across the notch in the axle-spindle and will lock the nut thereon.

The band of the wheel is formed with a notch, in which the pivoted key may be placed when in reverse position, at which time it is free from the notch in the end of the axle-spindle, and serves to lock the nut to the wheel, so that the latter may be used as a wrench for unscrewing the nut from the axle or screwing it thereon.

In the accompanying drawings, Figure 1 is a perspective view of the device, partly in section, showing the nut connected to the hub for unscrewing. Fig. 2 is a front view, showing the nut locked to the axle. Fig. 3 is a longitudinal section on the line 3 3, Figs. 2 and 4. Fig. 4 is a longitudinal section on the line 4 4, Figs. 2 and 3.

A represents a hub provided with a point-band, B, notched, as shown at $b$. C is the axle, formed with the ordinary butting ring or collar $c$, and with a spindle on which the hub works, threaded at its end, as shown at $d$, for the reception of the nut which retains the wheel on the axle.

The nut E is of peculiar construction, having a cylindrical periphery to fit easily within a corresponding recess in the hub and a transverse groove or recess, $e$, extending across its diameter on the outer face. The said groove may extend in depth to one-half the thickness of the nut.

The eye of the nut is threaded to receive the threaded extremity of the axle-arm, which latter is formed with a recess or notch, $d'$, corresponding in dimensions with the recess or groove $e$ in the nut.

Within the recess $e$ of the nut is pivoted a key, F, adapted, as shown, to shut within the recess $e$ of the nut and the notch $d'$ of the axle when they are in line, and thus securely lock the nut on the axle and prevent it from turning.

In the reversed position of the key shown in Fig. 1, the said key rests in the notch $b$ of the hub-band, thereby connecting the nut with the wheel, so that the nut, being now free to turn on the axle, may be turned by the wheel for the purpose of screwing it off or on in detaching the wheel from the axle or securing it thereto.

Having thus described my invention, the following is what I claim as new therein and desire to secure by Letters Patent:

The nut E, formed with a groove, $e$, diametrically across its face, and provided with a key, F, pivoted therein, in combination with a notched axle to receive the key F for locking the nut thereto, and a hub, A, with a notched band, B, to receive the key when in reversed position for screwing the nut on or off, substantially as set forth.

ALEXANDER DENISON.

Witnesses:
   J. SIEG,
   LEN STEPHENSON.